(12) United States Patent
Wu et al.

(10) Patent No.: US 7,602,846 B1
(45) Date of Patent: Oct. 13, 2009

(54) EFFICIENTLY DISTRIBUTING VIDEO USING A HYBRID NETWORK THAT USES EXISTING INFRASTRUCTURE

(75) Inventors: Fang Wu, San Jose, CA (US); Wen-hsiung Chen, Sunnyvale, CA (US); Philip R. Graham, Milpitas, CA (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 967 days.

(21) Appl. No.: 10/871,206

(22) Filed: Jun. 18, 2004

Related U.S. Application Data

(60) Provisional application No. 60/491,946, filed on Aug. 1, 2003.

(51) Int. Cl.
*H04B 1/66* (2006.01)
(52) U.S. Cl. .................. 375/240.12; 372/240.24; 382/235; 382/244; 382/239; 725/67; 725/70; 725/68; 725/118; 725/71; 725/131
(58) Field of Classification Search ............ 374/240.12, 374/240.24, 240.25, 240.26; 382/233, 235, 382/239, 244; 725/67, 70, 68, 118, 71, 131; 375/240.12, 240.24
See application file for complete search history.

(56) References Cited

U.S. PATENT DOCUMENTS 6,438,171 B1 * 8/2002 Cartwright et al. ..... 375/240.26
6,593,860 B2 * 7/2003 Lai et al. ..................... 341/50
6,886,178 B1 * 4/2005 Mao et al. .................... 725/52
6,961,377 B2 * 11/2005 Kingsley ............... 375/240.12

OTHER PUBLICATIONS

Tudor, P N and Werner, O H. "Real-Time Transcoding of MPEG-2 Video Bit Streams." Proc. International Broadcasting Convention, Sep. 12-16, 1997. IEE Conference Publication No. 447, pp. 296-301. Available online at http://www.bbc.co.uk/rd/pubs/papers/pdffiles/ibc97ptw.pdf.

"MARS A1040 Datasheet." Amity Systems, Inc., 2004, San Jose, California. Available online at http://www.amity-systems.com/products/mars_a1040/mars_a1040_ds.pdf.

* cited by examiner

*Primary Examiner*—Shawn An
(74) *Attorney, Agent, or Firm*—Dov Rosenfeld; Inventek

(57) ABSTRACT

A method and apparatus for transporting a video program in compressed form from a source location to a second location. The method comprises receiving at an intermediate location a first compressed version of the video program using a first compression method, transported from the source location to an intermediate location over a first segment that includes a link of a first type. The method further comprises transcoding the first compressed version to a second compressed version compressed using a second compression method that is in relatively widespread use. The method further comprises sending the second compressed version to the second location over a link of a second type. The link of the second type includes infrastructure to transport video program streams compressed by the second compression method. The first compression method can achieve a higher compression ratio that the second compression method for approximately the same image quality.

17 Claims, 3 Drawing Sheets

EFFICIENTLY DISTRIBUTING VIDEO USING A HYBRID NETWORK THAT USES EXISTING INFRASTRUCTURE

RELATED PATENT APPLICATIONS

This invention claims priority of U.S. provisional patent application Ser. No. 60/491,946 entitled EFFICIENTLY DISTRIBUTING VIDEO USING A HYBRID NETWORK THAT USES EXISTING INFRASTRUCTURE, filed Aug. 1, 2003. Such provisional patent application is incorporated herein by reference.

BACKGROUND

This invention relates to distribution of compressed video for video services and provides an efficient method to use improved compression technologies while taking advantage of already-installed infrastructure.

Video services are currently being distributed digitally in compressed form by a wide array of video content suppliers. For example, residential digital video services may include digital television, video-on-demand, Internet streaming video, and so forth. One widely used compressed video standard for use in video services is the Moving Picture Experts Group (MPEG) MPEG-2 standard. For example, many receivers for digital video programs, e.g., set-top boxes (STBs) located in residential homes, receive video programs in the MPEG-2 format from a number of different video content suppliers via assorted transmission channels.

A video program may start as an analog program and be encoded into an MPEG-2 standard based transport stream. Alternately, the program may already be stored in a library in MPEG-2 format. The compressed transport stream may then be sent to the home in a variety of transport mechanisms, including one or more satellite links, digital subscriber loop access links, optical network links, coaxial cable networks, ATM networks, IP-based networks, satellite networks, wireless networks, and terrestrial broadcast networks.

Many standards are known for compressing video. The Moving Picture Experts Group (MPEG) has adopted a set of standards for video compression, including MPEG-1, MPEG-2 and MPEG-4. The ITU (International Telecommunication Union) has also developed several standards: the H.261, H.263, H.263+, H.263++. While many of these standards are widely known and used, it is currently only MPEG-2 that has a large infrastructure in-place. MPEG-2 is widely used in consumer DVDs, for satellite and digital cable television broadcasts, for video on demand (VOD), and so forth.

While MPEG-2 is certainly in widespread use, continues to be deployed, and is likely to continue to be deployed for quite some time, there has been continued effort to develop compression technologies that improve on the amount of compression achievable to obtain a given reconstructed image/video quality. The ITU-T Video Coding Experts Group (VCEG) started working a proposed H.26L standard in 1997. In 2001, ISO/IEC MPEG joined the ITU-T VCEG to form a Joint Video Team (JVT) that took over the H.26L project of the ITU-T. The result of this effort is an emerging standard that dramatically improves the coding efficiency over that achievable with the now-common MPEG-2, even achieving more than 50% bit rate saving for the same picture quality. This standard is called H.264 herein. New techniques continue to be developed, and it will not be surprising if within a few years, a new compression method is available that provides yet another improvement in compression—as much as 50%.

Because MPEG-2 has been so widely adopted, with many billions of dollars already invested in infrastructure, e.g., in set top boxes that use MPEG-2, and because MPEG-2 provides "good enough" performance, and because MPEG-2 continues to be deployed, it would be difficult to convince entities that have invested heavily in MPEG-2 and other heavily adopted technology to abandon this investment to adopt the "latest and greatest" technology, even if such a new technology provides a significantly higher compression ratio. The inventors, who are experts in the field, expect MPEG-2 to continue to be used for many years.

Thus there is a need for methods and apparatuses that provide for using new improved compression methods in video distribution without forsaking investments already made in existing technology.

Note that it is only in the last few years that a digital video standard, MPEG-2, has started becoming so common. It is the first commonly used video standard. While previous standards were known and used, e.g., MPEG-1 and H.261, their use was relatively limited and their replacement using newer technology, such as MPEG-2, was without significant problems. Only now that there has been such widespread use of MPEG-2 is there likely to be resistance to replacing the infrastructure, even though the new technology such as H.264 is much better. The method and system of the invention provides a way to use the new technology "where it counts," keeping the existing infrastructure where it makes sense to do so. Thus, the invention provides a novel solution to a new need.

Note also that one aspect of the invention is to use transcoders. Transcoding between one compression standard and another is known. See for example, P. N. Tudor and O. H. Werner, "REAL-TIME TRANSCODING OF MPEG-2 VIDEO BIT STREAMS," Proceedings of the 1997 International Broadcasting Convention (IBC 97), held in Amsterdam Netherlands, published by IEE, pages 286-301, 1997. However, because infrastructure for transporting compressed streams is only now becoming widespread, the problem solved by the invention is new, and thus, so is the solution: the use of transcoding in this novel manner to solve this new problem.

SUMMARY

Disclosed herein is a method of transporting a video program in compressed form from a source location to a second location, e.g., an end location. The method comprises receiving at a first intermediate location a first compressed version of the video program, the first compressed version compressed using a first compression method. The first compressed version is transported from the source location to the first intermediate location over a first segment that includes a link of a first type for which video program streams compressed using the first compression method are suited. The method further comprises transcoding the first compressed version to a second compressed version of the video program using a first-method-to-second-method transcoder. The second compressed version is compressed using a second compression method. The method further comprises sending the second compressed version to the end location over a second segment that includes a link of a second type. The link of the second type including infrastructure to transport video program streams compressed using the second compression method. The second compression method is in relatively widespread use. The first compression method can achieve a higher compression ratio compared to the second compression method for approximately the same image quality. The link of the first type is suitable for a relatively highly compressed stream of video, e.g., because its bandwidth is relatively expensive or because infrastructure is not yet in place to make it expensive to introduce new infrastructure.

Also disclosed herein is a method of transporting a video program from a source location to an end location. The method comprises providing an original version of the video program at the source location. The method further comprises generating a first compressed version of the video program from the original version. The first compressed version is compressed using a first compression method. The method further comprises sending the first compressed version to the end location over a segment that includes a link for which the first compression method is suited. The original version is an uncompressed digital video program, or is an uncompressed analog video program, or is compressed using a second compression method. In the case that the original version is uncompressed, the generating includes compressing the original version to the first compressed version using a first compression method. In the case that the original version is compressed using the second compression method, the generating includes transcoding the original version to the first compressed version using a second-method-to-first-method transcoder. The second compression method is in relatively widespread use. The first compression method can achieve a higher compression ratio compared to the second compression method for approximately the same image quality.

Also disclosed herein is a method comprising providing a link of a first type between a source location and an end location. The end location linked to an end user by a link of a second type. The link of the second type including infrastructure to transport video program streams compressed using a second compression method. The method further comprises, at the end location, providing a first-method-to-second-method transcoder to transcode video program streams compressed using a first compression method into video program streams compressed using the second compression method. The method is implemented such that video program streams are transportable over the link of the first type and the link of the second type from the source location to the end user. The method is further implemented such that video program streams transported over the first link are compressed using the first compression method. The method is further implemented such that video program streams transported over the second link are compressed using the second compression method. The second compression method is in relatively widespread use. The first compression method can achieve a higher compression ratio compared to the second compression method for approximately the same image quality.

Also disclosed herein is an apparatus for transporting a video program in compressed form from a source location to an end location. The apparatus comprises a receiver to receive at a first intermediate location a first compressed version of the video program. The first compressed version is compressed using a first compression method. The first compressed version is transported from the source location to the first intermediate location over a first segment that includes a link of a first type for which video program streams compressed using the first compression method are suited. The apparatus further comprises a first-method-to-second method transcoder. The transcoder is to transcode the first compressed version to a second compressed version of the video program. The second compressed version is compressed using a second compression method. The apparatus further comprises a transmitter to send the second compressed version to the end location over a second segment that includes a link of a second type. The link of the second type includes infrastructure to transport video program streams compressed using the second compression method. The second compression method is in relatively widespread use. The first compression method can achieve a higher compression ratio compared to the second compression method for approximately the same image quality.

Also disclosed herein is an apparatus for transporting a video program from a source location to an end location. The apparatus comprises a receiver to receive an original version of the video program at the source location. The apparatus further comprises a generator to generate a first compressed version of the video program from the original version. The first compressed version is compressed using a first compression method. The apparatus further comprises a transmitter to send the first compressed version to the end location over a segment that includes a link for which the first compression method is suited. The original version is an uncompressed digital video program, or is an uncompressed analog video program, or is compressed using a second compression method. In one embodiment, the generator includes a compressor to compress the original version to the first compressed version using a first compression method in the case that the original version is uncompressed. In one embodiment, the generator includes a second-method-to-first-method transcoder to transcode the original version to the first compressed version in the case that the original version is compressed using the second compression method. The second compression method is in relatively widespread use. The first compression method can achieve a higher compression ratio compared to the second compression method for approximately the same image quality.

DETAILED DESCRIPTION

The invention provides apparatuses and methods that can be used by segmenting a video distribution network into a first segment ("type-1" segment) that includes a link of a first type (a type-1 link) where a relatively efficient, e.g., a relatively new compression technology, is possible, e.g., because the type-1 segment is cost sensitive and in which bandwidth is relatively expensive and a second segment ("type-2" segment) that includes a link of a second type (a type-2 link) where there is existing infrastructure using a second compression method, e.g., a common compression method such as MPEG-2. Transporting a video program across the relatively expensive, type-1 segment uses the first compression method while transporting across the type-2 segment uses the second compression method that is typically less efficient than the first. The type-2 segment is relatively inexpensive, e.g., because the type-2 segment is not as cost sensitive and where bandwidth is relatively inexpensive because of existing infrastructure.

For example, it is known that using a satellite transponder is a relatively expensive for a typical service provider of video programs, so there is incentive to increase the bandwidth efficiency. On the other hand, there is already a lot of infrastructure in place, e.g. coaxial cable, to transport video streams, e.g. MPEG-2 streams, from a source locations, e.g., a headend, to an end location, e.g., a consumer's home. MPEG-2 equipment is in common use in the home, and MPEG-2 video programs are widely available. Thus, for example, the coaxial cable from the headend to the home is relatively inexpensive.

One aspect of the invention is to provide an encoder/transcoder/decoder and an encoding/transcoding/decoding method from and to the first compression method of a "type-1" segment, and to provide an encoder/transcoder/decoder and an encoding/transcoding/decoding method from and to the second compression method used in a "type-2" segment.

Another aspect of the invention is the use of such methods and apparatuses in a network that combines one or more type-1 and type-2 segments. One particular example is when the type-2 segment uses MPEG-2 that is in widespread use, and a type-1 segment uses a coding method relatively more efficient than MPEG-2, e.g., H.264.

Figure 1:
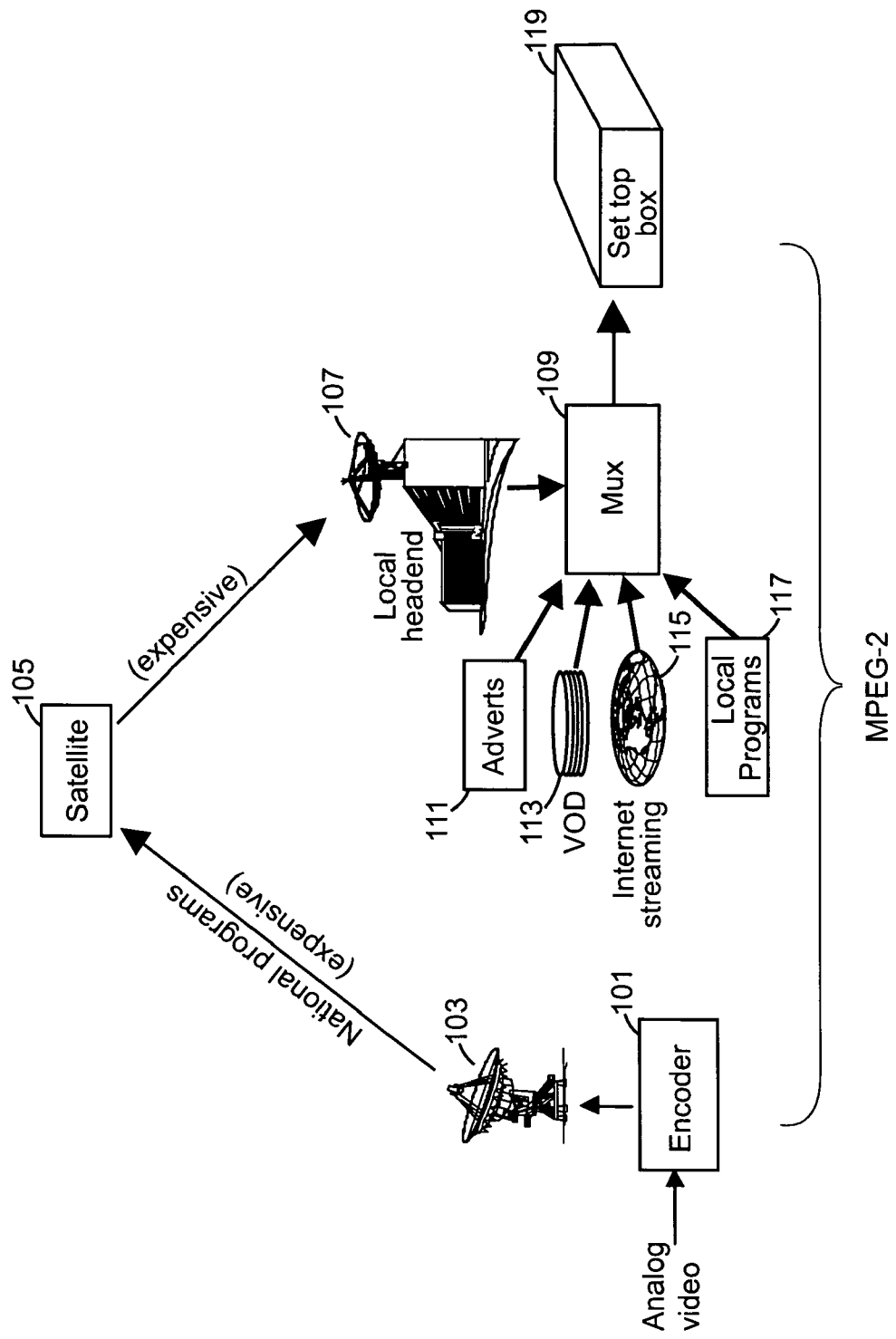
FIG. 1 shows an example of a prior art video distribution network that can benefit from the invention.

FIG. 1 shows an example of a prior art video distribution network that can benefit from the invention. In this example, an uncompressed video source is provided, e.g., an analog video program is taken from an analog source and digitized into a standard digitized video stream, e.g., a stream conforming to CCIR-601. The source may alternately be a video program compressed by the second method, e.g., a stream conforming to the MPEG-2 standard. In the example shown, the analog video is compressed by a second-method encoder 101 to a stream compressed using the second method, MPEG-2 in this example. In either case, the second-method-compressed stream is modulated and sent via a transmitter 103 to a satellite 105. Normally this process is done either at the video service providers' central office or the video content suppliers' place. At the downlink site, a satellite receiver 107 receives and demodulates the signal, e.g., to an MPEG-2 stream. The received MPEG-2 stream is typically but not necessarily multiplexed by a multiplexer 109 with one or more other compressed streams such as one or more of: local advertisements 111, video-on-demand (VOD) services 113, local programs 117, and other programs such as programs from the Internet 115. The updated multiplexed signal is sent to an end location such as a home set-top box 119 of an end user. The network path to the set top box may be by one or more of: a coaxial cable distribution network link, a digital subscriber loop access network link, an ATM network link, an optical network link, an IP-based packet network link, a satellite link, a wireless digital transmission link, and a terrestrial station link. Normally the transmitting to the end user's set-top box process is done by the video service providers' headend that is used to service a particular neighborhood.

Note that while FIG. 1 shows the multiplexing carried out at the same location as the receiving site (the downlink site), the multiplexing may be carried out at a second intermediate location between the receiving site and the end location.

Some of the link, e.g., the satellite link to the headend may involve relatively expensive network capacity.

Figure 2:
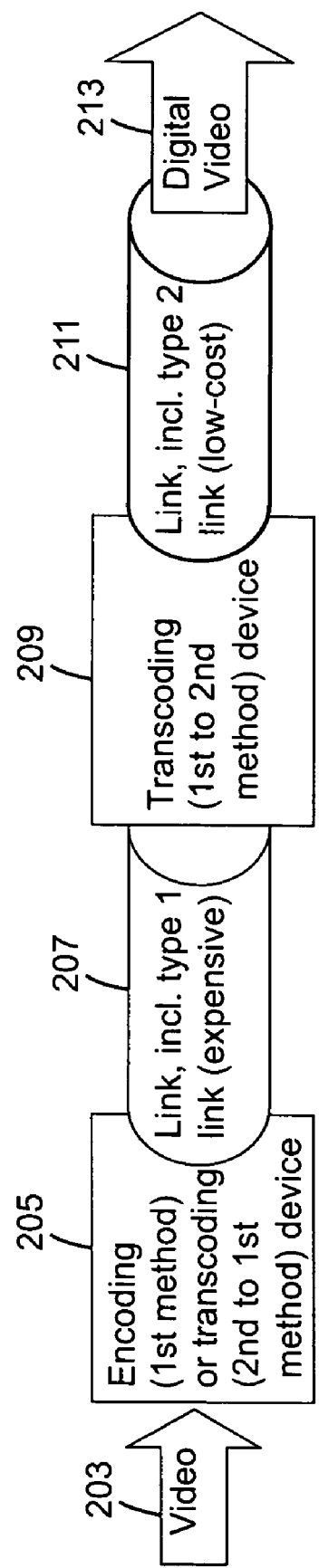
FIG. 2 shows a data flow diagram of an embodiment of the invention in a video delivery network. A video program at a source location is encoded by a first-method encoder into a first compressed version of the program compressed using a first compression method that provides a relatively high compression ratio, e.g., using a non-standard method, or using a standard method such as H.264 that is relatively more efficient than a second but more widely used compression method such as MPEG-2. In the case that the program is provided in a compressed version compressed using the second more common compression method, the encoding to the first compressed version includes second-method-to-first-method transcoding from the second-method-compressed version to the first-method-compressed-version of the program.

One aspect of the invention is shown in the data flow example shown in FIG. 2. A video program 203 at a source location is encoded by a first-method-encoder 205 into a first compressed version of the program compressed using (conforming to) a first compression method that provides a relatively high compression ratio, e.g., using a non-standard method, or using a standard method such as H.264 that is relatively more efficient than a second but more widely used compression method such as MPEG-2. Alternatively, or in addition, the source program is provided in a compressed version compressed using the second, more common compression method. In such a case, the encoding to the first compressed version includes transcoding from the second-method-compressed version to the first compressed version of the program using a second-method-to-first-method transcoder.

The first compressed version is transported via a link 207, e.g., a link for which bandwidth is relatively expensive or for which transporting using a program compressed using the first method is appropriate. An example is a satellite link, or an optical link, or some other link that provides for using the first compression method.

At a first intermediate location, the first compressed version is received and transcoded from the first compression method to the second compression method via a first-method-to-second-method transcoder 209. Thus, a stream—a second compressed version of the program—compressed using the relatively common second compression method, is available. The intermediate point may be a headend or some other interface point. The headend may include a multiplexer to multiplex the second compressed version with one or more other programs, such as one or more of: a local advertisement, a video-on-demand (VOD) program, a local program, and another program such as a program from the Internet to form a multiplexed set of programs. The multiplexed set of programs is sent by the intermediate location apparatus to an end location such as a home set-top box of an end user, as shown in FIG. 1. The network path 211 to the set top box may be by one or more of a coaxial cable distribution network link, a digital subscriber loop access network link, an ATM network link, an optical network link, an IP-based packet network link, a satellite link, a wireless digital transmission link, and a terrestrial station link.

Figure 3:
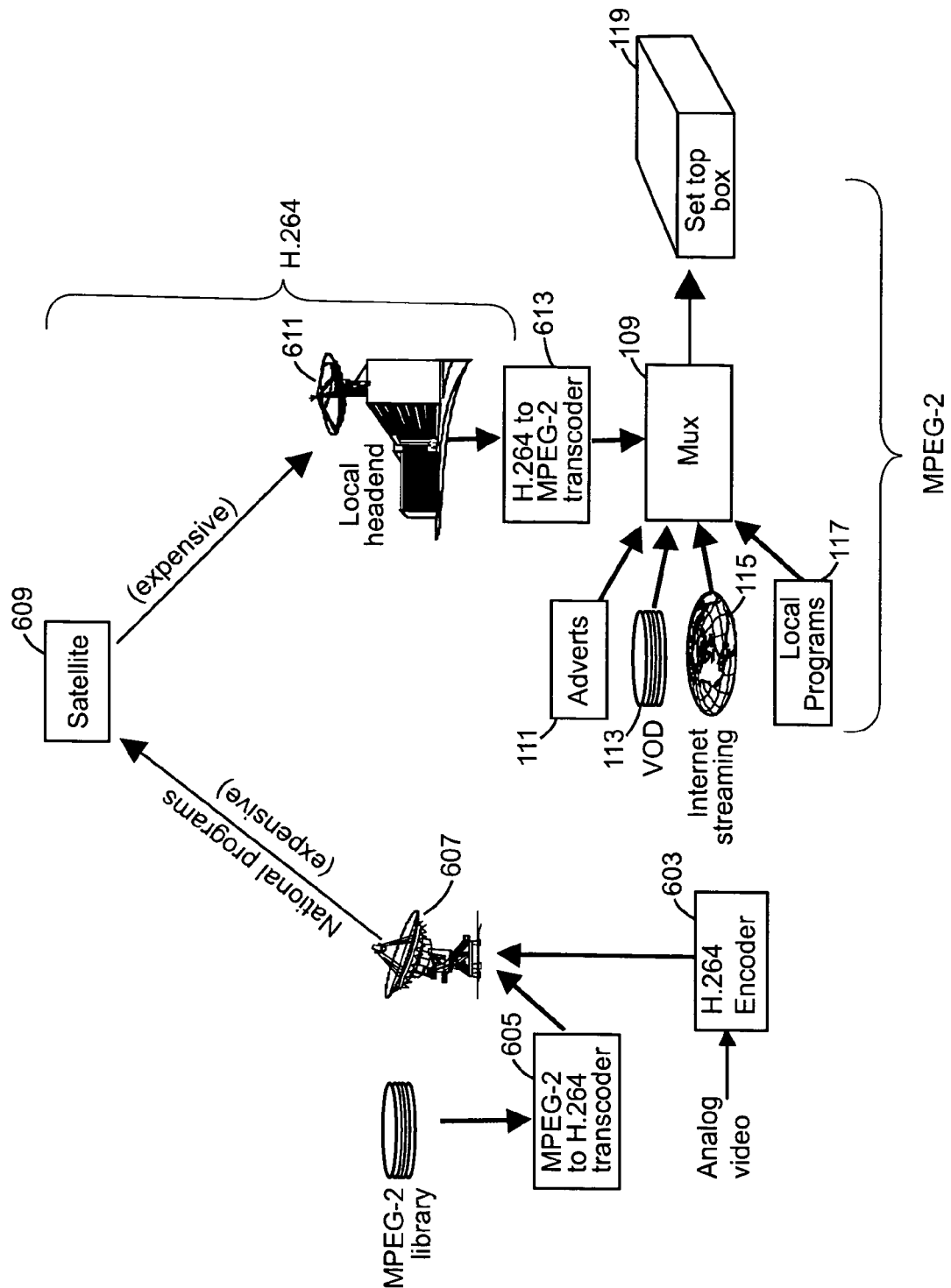
FIG. 3 shows an example of how a video distribution network of FIG. 1 may be modified to include an embodiment of the invention.

Note that while FIGS. 2 and 3 show the multiplexing being carried out at the same location as the receiving site (the downlink site), the multiplexing may be carried out at a second intermediate location between the receiving site and the end location.

Because the latest compression technology can dramatically improve the compression ratio from that provided by MPEG-2, the same bandwidth in the link of the first type, e.g., the relatively expensive link of the network can now carry more programs. For example, a service provider needs to rent less high-cost network bandwidth to carry the same number of programs as previously carried using MPEG-2. By using the first compression method-to-second compression method transcoder such as in transcoding step 209 to transcode the video stream encoded using the latest compression technology back to the older compression technology, e.g., MPEG-2, the service providers can use already installed end-user digital video receiving devices, without needing to update them.

In the case of H.264 being the first, e.g., latest compression method, and MPEG-2 being the second compression method, each of the inventive devices use one or more of the following elements: an H.264 encoder, an MPEG-2 to H.264 transcoder, an H.264 to MPEG-2 transcoder, an MPEG-2 multiplexer. One embodiment further includes an MPEG-2 demutiplexer/remultiplexer, and an H.264 demultiplexer/remultiplexer.

FIG. 3 shows an example of how FIG. 1 may be modified to include an embodiment of the invention. A source of video is provided. In one version, an uncompressed video source is available at a starting location, e.g., an analog source that is digitized into a standard digitized video stream conforming to, for example, CCIR-601. Alternately, or in addition, compressed digitized video encoded via a second-method video encoder that uses a second compression method such as MPEG-2 is available at the starting location. Before directly going to a high cost bandwidth network, such as the type-1 segment that includes the type-1 link, the video from the video source is encoded in a first-method encoder 603 using the first compression method, e.g., H.264, or the very latest efficient method, into a highly compressed stream. In case the video source is or includes uncompressed digitized video e.g., CCIR-601, the first-method-encoder 603 compresses the uncompressed video into a first compressed version using the first compression method. In the case that the video source includes video encoded using the second compression method, e.g., MPEG-2, the compressed video is transcoded by a second-method-to-first-method transcoder 605 into a first compressed version compressed according to the first compression method, e.g., H.264. When both source types are included, multiple compressed streams are generated. These may be multiplexed to form a new single compressed version. Thus, a first compressed version is produced using the first compression method.

The first compressed version is transported via a transmitter 607 through a type-1 link, e.g., a relatively expensive link such as a satellite link via a satellite 609, to a receiving site 611, a local headend in the example. At the receiving site, the first compressed version, e.g., H.264 compressed, is transcoded by a first-method-to second-method transcoder 613 to a second compressed version compressed by the second compression method, e.g., MPEG-2. As is common, one or more local programs and/or local advertisements and/or locally stored video on demand (VOD) programs and/or other streams, some of which are from the Internet, may be added at this point by a multiplexer 109 to form a multiplexed set of programs compressed by the second method. The multiplexed set of programs is transported to a final destination. Note that there may be no multiplexing at the receiving site 611, in which case the second compressed version is transported directly to the final destination after the first-method-to-second-method transcoding. The final destination in the example provided by FIG. 3 is a viewer's set top box 119 reached via a local video distribution network that distributes to the viewer's set top box 119. In the example, the local distribution network is a type-2 link, i.e., a common relatively inexpensive network using the older, type-2 compression technology, e.g., MPEG-2.

Because the latest compression technology can dramatically improve the compression ratio from that provided by MPEG-2, the same bandwidth in the expensive type-1 link can now carry more programs. For example, a service provider needs less high-cost network bandwidth to carry the same number of programs as previously carried using MPEG-2. By using the first-method-to second-method transcoder 613 to transcode the video stream encoded using the latest compression technology to the older compression technology, e.g., MPEG-2, the service providers can use already installed end-user digital video receiving devices, without needing to upgrade such devices.

In the case of H.264 being the first compression method, and MPEG-2 being the second compression method, each of the inventive devices use one or more of the following elements: an MPEG-2 to H.264 transcoder and an H.264 to MPEG-2 transcoder.

The features of using this method and the devices include:
Increasing the programs for service providers without increasing the cost for renting the bandwidth.
Improving the revenue opportunity for the service providers.
Adapting to the latest compression technology without affecting millions of end-users.

With H.264, the latest emerging video compression standard, there is on average more than 50% bit rate saving over traditional MPEG-2 or H.263 compression. By adopting this technology, service providers can double amount of programs by using the same amount of satellite transponders, or by cutting the amount of satellite transponders into half without sacrificing the amount of programs they provide to their customers.

An example of a customer is a modern cable operator such as the Comcast Corporation, Philadelphia, Pa. ("Comcast"). Using a version of the inventive method, a cable operators, such as Comcast, now has a way to double, eventually possibly triple its satellite transponder capacity, in terms of distributing video programs, without changing the existing equipment and services, e.g., the millions of set top boxes it has in the field. When Comcast was TCI/AT&T, the inventors believed it uplinked 150 MPEG-2 programs using 15 transponders. Using the invention, the cost savings could be $2M to $6M, say $4M per transponder, and/or $60M per year.

The inventive method is also applicable to direct broadcast satellite (DBS) operators such as Direct-TV, Dish, STAR, SKY-B-SKY, and so forth. This may occur, for example, if it becomes cheaper to build a transcoder such as an MPEG-2 to/from H.264 transcoder that to build an H.264 set-top box.

As long as MPEG-2 is used to distribute video, and it appears that cable operators such as Comcast, will continue to use and increase their use of MPEG-2, the method and system of the present invention is applicable not only to satellite but also to any other networks including fiber and terrestrial networks.

Aspects of the invention also provide a roadmap for a carrier, e.g., a Comcast cable operator for eventual adaptation of H.264, (or newer) methods for video distribution deployment. A version of invention can be used with the existing MPEG-2 end-users, with new customers being provided with H.264 set-top boxes.

Thus described herein is a hybrid method for delivering digital video to a second location by using a highly efficient, not necessarily standard (and not-necessarily non-standard) video compression method over parts of a network where bandwidth is expensive or limited, and using well-known standard compression over those parts of the network where either there is already infrastructure that supports the well-known standard, or in which bandwidth is relatively inexpensive. One aspect of the invention is the use of an encoder that encodes into the highly efficient compression method. Another aspect is a transcoder and use of the transcoder that transcodes from the well-known standard compressed video to the highly efficient standard compressed video. Another aspect is a transcoder and use of the transcoder that transcodes from the highly efficient standard compressed video to the well-known standard compressed video.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

By a video program stream compressed using a particular compression method is meant: 1) a video program stream originally in an uncompressed form and compressed using the particular compression method, e.g., for the particular method being H.264, a digitized uncompressed video program stream conforming in CCIR-601 compressed into a stream substantially conforming to H.264, or 2) a video program stream in a compressed form but compressed using a method other than the particular method, transcoded into a stream conforming to the particular compression method, e.g., for the particular method being H.264, a stream compressed according to MPEG-2 transcoded into a compressed video program stream substantially conforming to H.264, or 3) a stream combining H.264, two or more of a H.264 stream, an uncompressed stream compressed into H.264, and a compressed stream transcoded into H.264.

By a link of a first type (a type-1 link) for which a first compression method is suited is meant that bandwidth is relatively expensive on such a link, or there is not yet such an established infrastructure for that link for transporting using programs compressed according to an alternate method such that it is economically desirable or feasible to transport streams compressed using the first method.

The term "existing infrastructure" is meant to include equipment that forms part of the link, and equipment attached to the link. Thus, an existing set top box at the end location is included in the meaning of existing infrastructure for the link to the end location.

Note that while aspects of the invention include transcoding. The actual transcoder and transcoding method is not in itself being claimed. How to carry out transcoding from one form to another is assumed to be known, and transcoders certainly are known. The invention is about a novel method of using transcoding, and about a system that includes a transcoder. The invention is not, however restricted to using or providing known methods of transcoding and transcoders. Future transcoding apparatuses and methods may be used without departing from the spirit or scope of the invention.

It should further be appreciated that although the invention has been described in the context of a first compression method that substantially conforms to H.264 and a second more common method that is MPEG-2, the invention is not limited to such contexts and may be utilized in various other applications and systems. In the future, a newer compression method than MPEG-2 may become the established one with established infrastructure, e.g., H.264, and a newer, more efficient method than H.264 may become available. The invention is meant to include such cases.

While the above embodiments include those wherein the second location is the end location where there is an end user, the invention is not restricted to such a second location, and is applicable to transporting video to any second location via an intermediate location from where there is a link of the second type between the intermediate location and the second location.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating an apparatus including a first-video-compression-method-to-second-video-compression-method transcoder for transporting a video program to a second location, the method comprising:

receiving at a first intermediate location a first compressed version of the video program, the first compressed version compressed using a first video compression method, the first compressed version transported from a source location to the first intermediate location over a first segment that includes a link of a first type for which video program streams compressed using the first video compression method are suited;

carrying out video-compression-method-to-different-video-compression-method transcoding of the first compressed version to a second compressed version of the video program using the first-video-compression-method-to-second-video-compression-method transcoder, the second compressed version compressed using a second video compression method; and sending the second compressed version to the second location over a second segment that includes a link of a second type, the link of the second type including infrastructure to transport video program streams compressed using the second video compression method, wherein the second video compression method is relatively in widespread use, wherein the first video compression method can achieve a higher compression ratio than the second video compression method for approximately the same image quality, and wherein the video program is provided at the source location in a third version of the video program compressed using the second video compression method, such that the method comprises at the source location carrying out video-compression-method-to-different-video-compression transcoding of the third compressed version of the video program to the first compressed version using a second-video-compressionmethod-to-first-video-compression-method transcoder, the second compressed version compressed using the second video compression method.

2. A method as recited in claim 1, wherein the second video compression method substantially conforms to MPEG-2.

3. A method as recited in claim 2, wherein the first video compression method substantially conforms to H.264.

4. A method as recited in claim 3, wherein the first-video-compression-method-to-second-video-compression-method transcoder is an H.264 to MPEG-2 transcoder.

5. A method as recited in claim 2, wherein the link of the first type includes a satellite link.

6. A method as recited in claim 2, wherein the first intermediate location is a headend of a service provider.

7. A method as recited in claim 6, wherein the link of the second type includes at least one member of the group consisting of a coaxial cable distribution network link, a digital subscriber loop access network link, an ATM network link, an optical network link, an IP-based packet network link, a satellite link, a wireless digital transmission link, and a terrestrial station link.

8. A method as recited in claim 1, wherein the first compression video method substantially conforms to H.264.

9. A method as recited in claim 1, wherein the link of the first type includes at least one member of the group consisting of a coaxial cable network link, a digital subscriber loop access network link, an ATM network link, an optical network link, an IP-based packet network link, a satellite link, a wireless digital transmission link, and a terrestrial station link.

10. A method as recited in claim 1, further comprising:
at a second intermediate location, multiplexing the second compressed version with at least one member of the group consisting of a local advertisement, a video-on-demand (VOD) program, a local program, and a program from the Internet to produce a multiplexed set of programs,
wherein the sending of the second compressed version includes sending the multiplexed set of programs from the second intermediate location.

11. A method as recited in claim 10, wherein the second intermediate location is the same location as the first intermediate location.

12. A method as recited in claim 10, wherein the multiplexing uses at least one of an MPEG-2 multiplexer, an MPEG-2 demultiplexer/remultiplexer, and an H.264 demultiplexer/remultiplexer.

13. A method as recited in claim 1,
wherein the first compression method is H.264,
wherein the second compression method is MPEG-2, and
wherein the second-video-compression-method-to-first-video-compression method transcoder is an MPEG-2 to H.264 transcoder.

14. An apparatus for transporting a video program in compressed form from a source location to a second location, the apparatus comprising:
a receiver to receive at a first intermediate location a first compressed version of the video program, the first compressed version compressed using a first compression method, the first compressed version transported from the source location to the first intermediate location over a first segment that includes a link of a first type for which video program streams compressed using the first video compression method are suited;
a first-video-compression-method-to-second-video-compression-method transcoder, the transcoder to transcode the first compressed version to a second compressed version of the video program, the second compressed version compressed using a second video compression method; and
a transmitter to send the second compressed version to the second location over a second segment that includes a link of a second type, the link of the second type including infrastructure to transport video program streams compressed using the second video compression method,
wherein the second video compression method is relatively in widespread use,
wherein the first video compression method can achieve a higher compression ratio compared to the second video compression method for approximately the same image quality, and
wherein the video program is provided at the source location in a third version of the video program compressed using the second video compression method, such that second-video-compression-method-to-different-video-compression transcoding of the third compressed version of the video program to the first compressed version is carried out at the source using a second-video-compression-method-to-first-video-compression-method transcoder, the second compressed version compressed using the second video compression method.

15. An apparatus as recited in claim 14, wherein the second video compression method substantially conforms to MPEG-2.

16. An apparatus as recited in claim 15, wherein the first video compression method substantially conforms to H.264.

17. An apparatus as recited in claim 16, wherein the first-video-compression-method-to-second-video-compression-method transcoder is an H.264 to MPEG-2 transcoder.

* * * * *

UNITED STATES PATENT AND TRADEMARK OFFICE
CERTIFICATE OF CORRECTION

PATENT NO. : 7,602,846 B1  Page 1 of 1
APPLICATION NO. : 10/871206
DATED : October 13, 2009
INVENTOR(S) : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1312 days.

Signed and Sealed this

Fifth Day of October, 2010

David J. Kappos
*Director of the United States Patent and Trademark Office*